United States Patent
Couture, Jr. et al.

(10) Patent No.: US 7,344,357 B2
(45) Date of Patent: Mar. 18, 2008

(54) METHODS AND APPARATUS FOR ASSEMBLING A ROTARY MACHINE

(75) Inventors: Bernard Arthur Couture, Jr., Schenectady, NY (US); Flor Del Carmen Rivas, Clifton Park, NY (US); Mark Edward Kelly, Alplaus, NY (US); Jason Paul Mortzheim, Gloversville, NY (US)

(73) Assignee: General Electric Company, Schenectady, NY (US)

( * ) Notice: Subject to any disclaimer, the term of this patent is extended or adjusted under 35 U.S.C. 154(b) by 145 days.

(21) Appl. No.: 11/219,268

(22) Filed: Sep. 2, 2005

(65) Prior Publication Data

US 2007/0053772 A1    Mar. 8, 2007

(51) Int. Cl.
*F01D 11/02* (2006.01)
*F16J 15/447* (2006.01)

(52) U.S. Cl. .............................. 415/174.2; 415/174.5; 277/413

(58) Field of Classification Search ............. 415/174.2, 415/174.5, 168.2, 168.4, 231; 277/413
See application file for complete search history.

(56) References Cited

U.S. PATENT DOCUMENTS

| | | | |
|---|---|---|---|
| 5,002,288 | A | 3/1991 | Morrison et al. |
| 5,401,938 | A | 3/1995 | Froeschke et al. |
| 5,503,405 | A | 4/1996 | Jewett et al. |
| 5,709,388 | A | 1/1998 | Skinner et al. |
| 6,022,027 | A | 2/2000 | Chevrette et al. |
| 6,065,754 | A | 5/2000 | Cromer et al. |
| 6,651,986 | B2 | 11/2003 | Chevrette et al. |
| 6,695,316 | B2 | 2/2004 | Popa et al. |
| 6,715,766 | B2 * | 4/2004 | Kirby et al. ............... 277/413 |
| 2003/0062686 | A1 * | 4/2003 | Uehara et al. ............. 277/411 |
| 2004/0096319 | A1 * | 5/2004 | Uchida et al. ........... 415/174.5 |

* cited by examiner

*Primary Examiner*—Richard A. Edgar
(74) *Attorney, Agent, or Firm*—Armstrong Teasdale LLP

(57) ABSTRACT

A method for assembling at least one seal assembly to a turbine having a casing extending at least partially around a rotor is provided. The method includes coupling the seal assembly to the casing such that the seal assembly extends into a fluid flow passage defined between the rotor and the casing and coupling at least one spring between the seal assembly and the casing to bias each seal assembly.

20 Claims, 4 Drawing Sheets

METHODS AND APPARATUS FOR ASSEMBLING A ROTARY MACHINE

BACKGROUND OF THE INVENTION

The present invention relates generally to rotary machines and, more particularly, to a seal assembly for use in a rotary machine.

At least some steam turbines have a defined steam path which includes, in serial-flow relationship, a steam inlet, a turbine, and a steam outlet. Steam leakage, either out of the steam path or into the steam path, from an area of higher pressure to an area of lower pressure may adversely affect an operating efficiency of the turbine. For example, steam-path leakage in the turbine between a rotating rotor shaft of the turbine and a circumferentially surrounding turbine casing, may lower the efficiency of the turbine. Additionally, steam-path leakage between a shell and the portion of the casing extending between adjacent turbines may reduce the operating efficiency of the steam turbine and over time, may lead to increased fuel costs.

To facilitate minimizing steam-path leakage between a turbine section and a bearing, at least some known steam turbines use a packing casing that includes a plurality of labyrinth seals. Some known labyrinth seals include longitudinally spaced-apart rows of labyrinth seal teeth which are used to seal against pressure differentials that may be present in the steam turbine. Brush seals may also be used to minimize leakage through a gap defined between two components. Although brush seals generally provide a more efficient seal than labyrinth seals, at least some known steam turbines, which rely on a brush seal assembly between turbine sections and/or between a turbine section and a bearing, also use at least one labyrinth seal as a redundant backup seal for the brush seal assembly. As a result, manufacturing costs may be increased.

The labyrinth seals are repositioned and modulated radially to adjust steam leakage flow either passively, as a function of turbine operating conditions, or, actively based on operator intervention. In general, while in the passive mode, as turbine load is increased the seals move radially inward from the retracted condition until they are fully inserted at or near full load. When fully inserted, the gap defined between the seal teeth and the turbine rotor shaft is at the minimum value and therefore any turbine transients may induce unintentional contact between the seal teeth and the rotor. The use of the active mode may reduce or eliminate contact by providing operators with a mechanism for actuating the seals as necessary in anticipation of conditions that may induce contact. Additionally, the active seal control mechanisms can be automated to achieve substantially similar results. When the turbine has been accelerated to operating speed and partially loaded, thermal gradients, vibrations and misalignments are expected to be within pre-determined ranges for the current operational conditions. Delaying the inward travel of the seals until this point in the turbine operation process minimizes the potential for inadvertent seal-to-rotor contact.

BRIEF DESCRIPTION OF THE INVENTION

In one aspect, a method for assembling at least one seal assembly to a turbine having a casing extending at least partially around a rotor is provided. The method includes coupling the seal assembly to the casing such that the seal assembly extends into a fluid flow passage defined between the rotor and the casing, and coupling at least one spring between the seal assembly and the casing to bias each seal assembly.

In another aspect, a seal assembly for a turbine assembly is provided. The seal assembly includes an annular groove formed in a stationary casing extending at least partially circumferentially around the turbine and a seal ring positioned within the annular groove. The seal ring includes a plurality of arcuate seal ring segments. At least one spring is coupled between each seal ring and the stationary casing for inducing a substantially constant spring force to each of the plurality of seal ring segments.

In a further aspect, a rotary machine is provided. The rotary machine includes at least one rotor assembly, at least one stationary turbine casing extending at least partly circumferentially around the at least one rotor assembly such that a clearance gap is defined between the rotor assembly and the stationary turbine casing, and a plurality of seal assemblies positioned between the stationary casing and the rotor assembly to facilitate controlling the fluid flow through the clearance gap. At least one spring is positioned between each of the plurality of seal assemblies and the casing to bias each of the plurality of seal assemblies radially outward away from the rotor assembly.

DETAILED DESCRIPTION OF THE INVENTION

Figure 1:
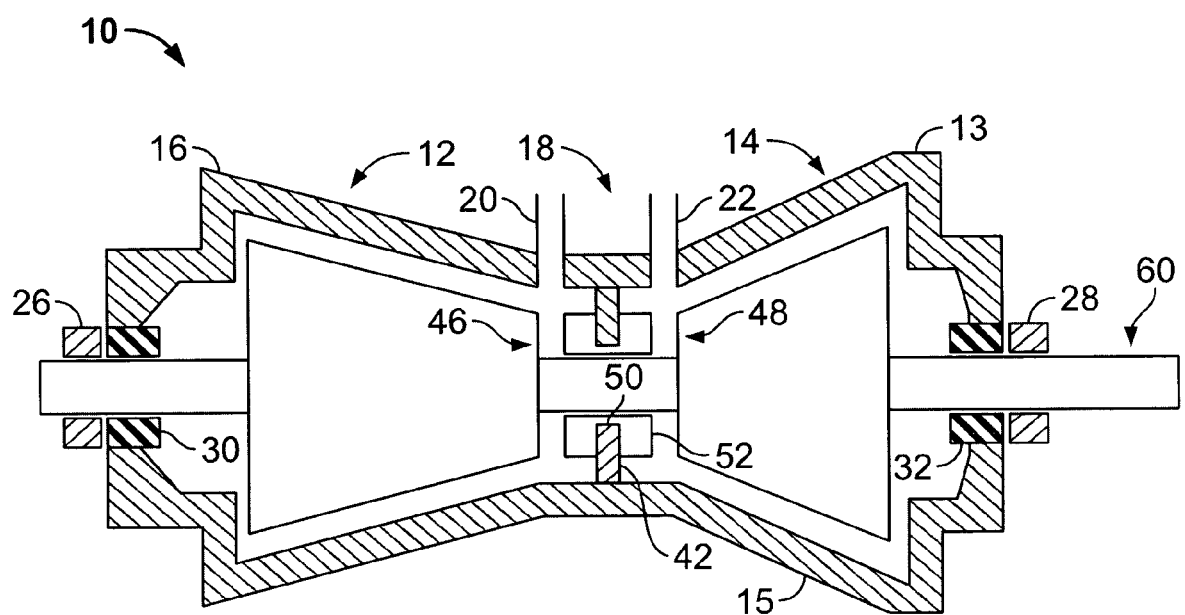
FIG. 1 is a schematic illustration of an exemplary opposed flow High Pressure (HP)/Intermediate Pressure (IP) steam turbine.

FIG. 1 is a schematic illustration of an exemplary opposed-flow steam turbine 10 including a high pressure (HP) section 12 and an intermediate pressure (IP) section 14. An outer shell or casing 16 is divided axially into upper and lower half sections 13 and 15, respectively, and spans both HP section 12 and IP section 14. A central section 18 of shell 16 includes a high pressure steam inlet 20 and an intermediate pressure steam inlet 22. Within casing 16, HP section 12 and IP section 14 are arranged in a single bearing span supported by journal bearings 26 and 28. A steam seal unit 30 and 32 is located inboard of each journal bearing 26 and 28, respectively.

An annular section divider 42 extends radially inwardly from central section 18 towards a rotor shaft 60 that extends between HP section 12 and IP section 14. More specifically, divider 42 extends circumferentially around a portion of rotor shaft 60 between a first HP section nozzle 46 and a first IP section nozzle 48. Divider 42 is received in a channel 50 defined in packing casing 52. More specifically, channel 50 is a C-shaped channel that extends radially into a packing casing 52 and around an outer circumference of packing casing 52, such that a center opening of channel 50 faces radially outwardly.

During operation, high pressure steam inlet 20 receives high pressure/high temperature steam from a steam source, for example, a power boiler (not shown). Steam is routed through HP section 12 wherein work is extracted from the steam to rotate rotor shaft 60. The steam exits HP section 12 and is returned to the boiler wherein it is reheated. Reheated steam is then routed to intermediate pressure steam inlet 22 and returned to IP section 14 at a reduced pressure than steam entering HP section 12, but at a temperature that is approximately equal to the temperature of steam entering HP section 12. Accordingly, an operating pressure within HP section 12 is higher than an operating pressure within IP section 14, such that steam within HP section 12 tends to flow towards IP section 14 through leakage paths that may develop between HP section 12 and IP section 14. One such leakage path may be defined extending through packing casing 52 within rotor shaft 60.

Figure 2:
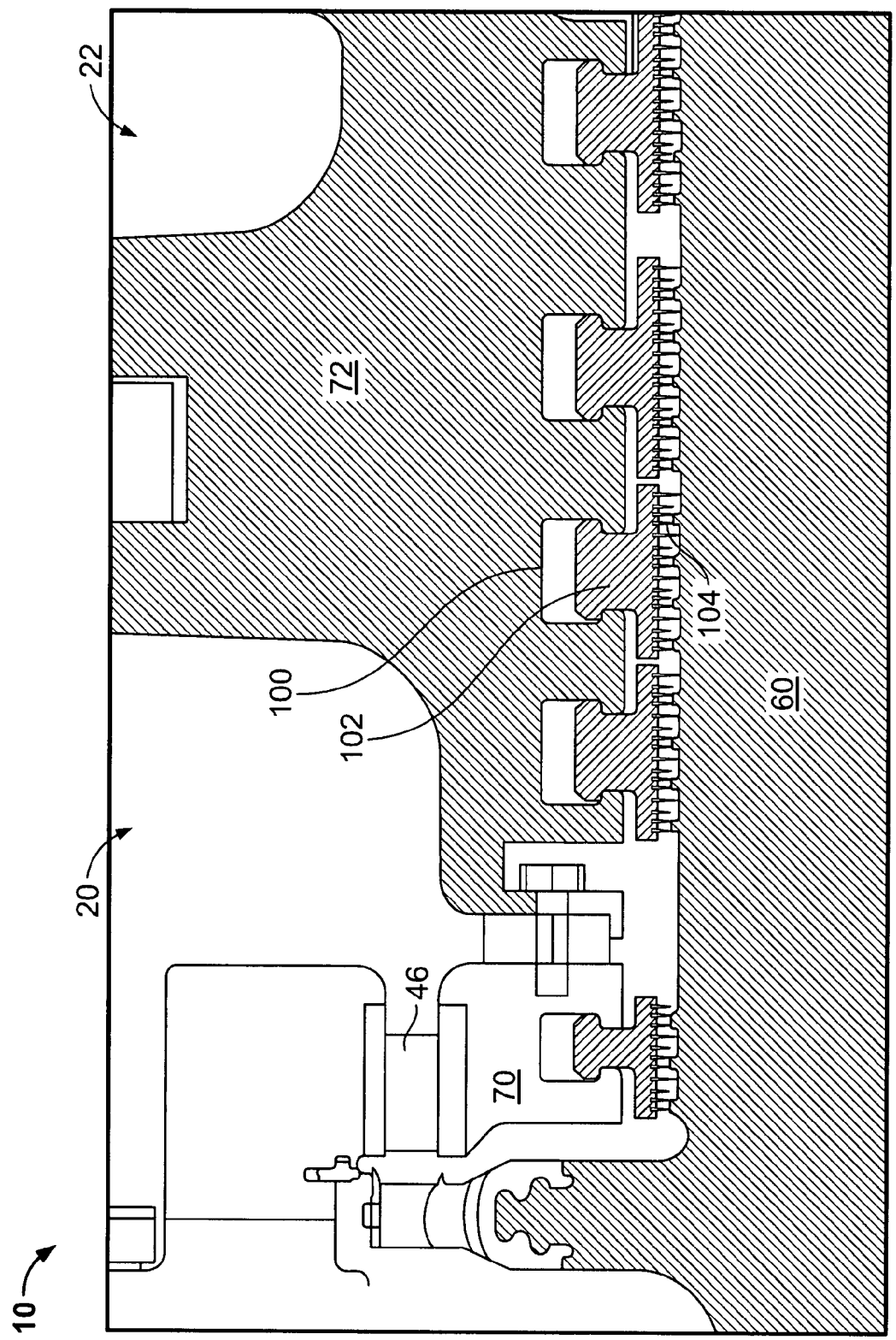
FIG. 2 is an enlarged schematic illustration of a turbine nozzle diaphragm and a packing casing that may be used with the steam turbine shown in FIG. 1.

FIG. 2 is an enlarged schematic illustration of an exemplary turbine nozzle diaphragm 70 and a packing casing 72 that may be used with turbine 10. In the exemplary embodiment, nozzle diaphragm 70 is a first stage diaphragm used with high pressure turbine 12. Moreover, in the exemplary embodiment packing casing 72 includes a plurality of labyrinth seal assemblies 100 that facilitate reducing leakage from HP section 12 to IP section 14 along rotor shaft 60. Labyrinth seal assemblies 100 include longitudinally spaced-apart rows of teeth 104 attached to a seal ring 102 that facilitate sealing against operating pressure differentials that may be present in a steam turbine such as turbine 10. In an alternative embodiment, packing casing 52 includes brush seals that may also be used to facilitate minimizing leakage through a gap defined between two components, such as leakage flowing from a higher pressure area to a lower pressure area.

In operation, steam at higher pressure in HP section 12 tends to leak through a steam path defined between first stage nozzle diaphragm 70 and packing casing 72 to IP section 14, an area at a lower operating pressure. For example, in one embodiment, high pressure steam is admitted to HP section 12 at approximately 1800 pounds per square inch absolute (psia), and reheat steam is admitted to IP section 14 at between approximately 300-400 psia. Accordingly, a relatively large pressure drop across packing casing 72 may cause steam to leak around packing casing 72 along rotor shaft 60 resulting in a reduction in steam turbine efficiency.

Figure 3:
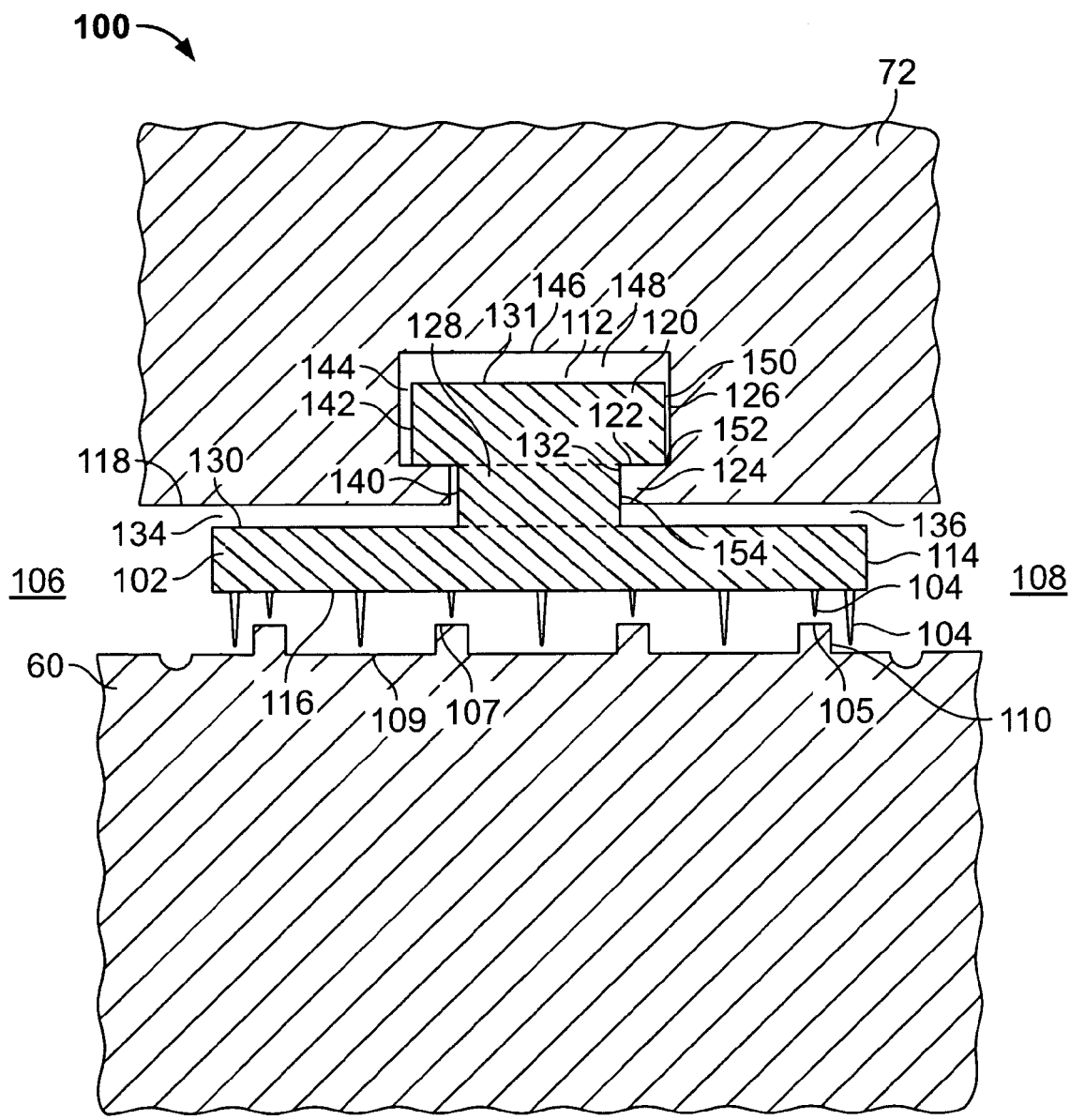
FIG. 3 is an exemplary embodiment of a labyrinth seal assembly that may be used with the steam turbine shown in FIG. 1.

FIG. 3 is an exemplary embodiment of a labyrinth seal assembly 100 that may be used with turbine 10. In FIG. 3 only a portion of rotor shaft 60 and a portion of casing 72 are illustrated. Furthermore, although only a single seal ring 102 is illustrated, several such rings could be arranged in series as shown in FIG. 2. In alternative embodiments, labyrinth seal assemblies 100 are used to facilitate sealing in other areas of turbine 10.

Seal ring 102 includes a plurality of teeth 104 positioned in opposition to a plurality of rotor shaft circumferential projections 105 extending outward from rotor shaft 60. In the exemplary embodiment, each circumferential projection 105 includes radially outer rotor surfaces 107 positioned between a plurality of radially inner rotor surfaces 109. As explained above, a positive force may force fluid flow between the multiple restrictions formed by a clearance area 110 defined between teeth 104 and rotor shaft 60. More specifically, the combination of clearance area 110, the number, and relative sharpness, of teeth 104, the number of rotor shaft circumferential projections 105, and the operating conditions, including pressure and density, are factors that determine the amount of leakage flow. Alternately, other geometrical arrangements can also used to provide multiple or single leakage restrictions.

Each seal ring 102 is retained in a casing groove 112 defined in casing 72. In one embodiment, each seal ring 102 includes a plurality of seal ring segments (not shown in FIG. 3) that may be positioned within casing groove 112 to facilitate ease of assembly or disassembly of casing 72. In the exemplary embodiment, a system of springs (not shown in FIG. 3) induces a force that will tend to enlarge a diameter of seal ring 102 and a second system of springs (not shown in FIG. 3) may be used to counter the force induced by the weight of seal ring 102.

Each seal ring 102 includes an inner ring portion 114 having teeth 104 extending from a radially inner surface 116, and a radially outer surface 130 that facilitates controlling clearance area 110 by contacting a radial surface 118 of casing 72. Each seal ring 102 also includes an outer ring portion 120 that is positioned within casing groove 112. Outer ring portion 120 includes an inner circumferential surface 122 and an opposite radially outer surface 131. Inner circumferential surface 122 contacts an outer surface 126 of a casing groove shoulder 124 such that radial inward movement of seal ring 102 is limited. Seal ring 102 also includes a neck portion 128 extending between seal ring inner ring portion 114 and seal ring outer ring portion 120. Casing groove shoulder 124 interacts with seal ring neck portion 128 to axially locate each seal ring 102. Seal ring neck portion 128 includes a contact pressure surface 132 that contacts casing groove shoulder 124.

One steam flow path through labyrinth seal assembly 100 is defined from high pressure region 106 to low pressure region 108 through clearance area 110 and between teeth 104 and rotor shaft surfaces 107 and 109. Steam flow is modulated as a function of radial positioning of seal ring 102. As seal ring 102 moves radially outward, the overall size of clearance area 110 increases and steam flow through clearance area 110 increases. Conversely, as seal ring 102 moves radially inward, clearance area 110 decreases and steam flow through clearance area 110 decreases.

A second steam flow path is defined from high pressure annular space 134 to low pressure annular space 136 through casing groove 112. Steam at a higher pressure may flow from annular space 134 through an annular opening 140 defined between casing groove shoulder 124 and seal ring neck portion 128. Steam is channeled through opening 140 to a high pressure region 142 defined between casing groove shoulder outer surface 126 and seal ring outer ring portion ring circumferential surface 122 before entering a casing groove high pressure portion 144 defined by the casing 72 and seal ring outer ring portion 120. Steam exits casing groove high pressure portion 144 and enters a casing groove radially outer portion 148 defined between a casing groove radially outer surface 146 and seal ring outer portion radially outer surface 131. Steam may then flow to a low pressure portion 150 defined by the casing 72 and seal ring outer ring portion 120 and to a low pressure side shoulder region 152 defined between casing groove shoulder outer surface 126 and seal ring outer ring portion inner circumferential surface 122. Steam exits low pressure side shoulder region 152 through an annular opening 154 defined between casing groove shoulder 124 and seal ring neck portion 128, wherein the steam is discharged into annular space 136.

Radially outward travel of seal ring 102 is limited when seal ring outer surface 130, or any portion thereof, contacts casing radial surface 118. This position is referred to as the fully retracted position. Radially inward travel of seal ring 102 is limited when seal ring surface 122 contacts casing groove shoulder surface 126. This position is referred to as the fully inserted position, as is illustrated in FIG. 3. Sufficient space to accommodate expected transient misalignments of rotor shaft 60 and casing 72, without incurring damage to teeth 104, is provided for.

At low or no load operating conditions, the weight of seal ring 102, the confining limits of casing 72, frictional forces, and the forces of a plurality of biasing spring systems (not shown on FIG. 3) act on seal ring 102. The overall effect is that seal ring 102 is biased to a diameter as limited by the radially outward limit of travel of seal ring 102.

Internal pressures throughout the turbine 10 are substantially proportional to load. As load and steam mass flow are each increased, local pressures increase in a substantially linear fashion. This relationship can be used to determine desired positions of seal ring 102 at pre-determined turbine operating conditions. For example, as steam flow to turbine 10 is increased, steam pressure in annular space 134 and in casing groove 112 is likewise increased. The increased steam pressure exerts a radially inward force to seal ring 102 that is substantially carried by seal ring outer surfaces 130 and 131.

The increased steam pressure in high pressure region 106 induces increased steam flow via casing groove 112 through annular space 134, annular opening 140, shoulder region 142, casing groove high pressure portion 144, casing groove radially outer portion 148, casing groove low pressure portion 150, shoulder region 152, and annular opening 154 into annular region 136. The increased steam pressure in high pressure region 106 also induces increased pressures in the path defined from annular space 134 to annular space 136 via casing groove 112 as described above. The pressures in each subsequent region of the path are less than the regions preceding them. For example, the steam pressure in casing groove low pressure portion 150 is less than the steam pressure in casing groove high pressure portion 144. This pressure differential induces an increased force to the right on seal ring inner ring portion 114, seal ring neck portion 128 and seal ring outer ring portion 120. The increased forces on these surfaces causes seal ring 102 to move axially toward the low pressure region 108 until seal ring neck contact pressure surface 132 contacts casing groove shoulder 124. When fully inserted steam flow from high pressure annular space 134 to low pressure annular space 136 via casing groove 112 is substantially prevented by seal ring 102.

The condition illustrated above causes steam pressure to induce an increased radially inward force to surfaces 130 and 131 as described above. The increased steam pressure also induces an increased radially inward force to seal ring 102 to overcome the previously discussed frictional forces and plurality of biasing spring sub-systems (not shown) forces.

The dimensions of seal ring 102 and casing groove 112 are selected to facilitate optimizing the clearance 110 defined between teeth 104 and rotor shaft 60 surface for loaded, steady state operation.

Figure 4:
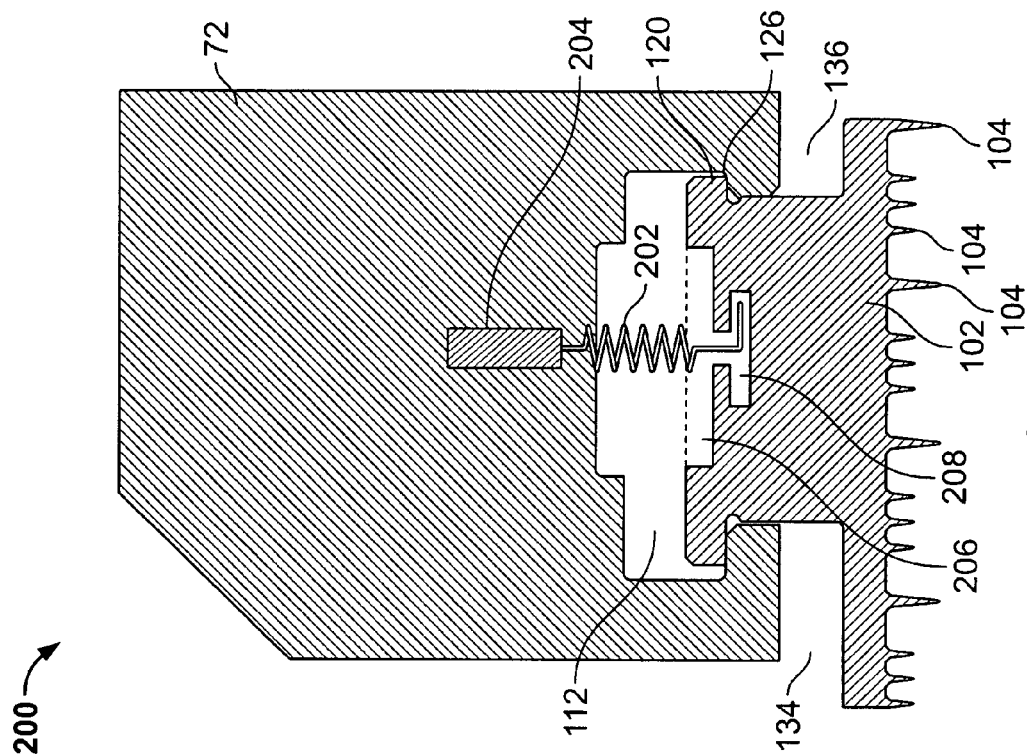
FIG. 4 is an exemplary embodiment of a sealing ring biasing spring sub-system that may be used with the labyrinth seal assembly shown in FIG. 3.

FIG. 4 is an exemplary embodiment of a sealing ring biasing spring sub-system 200. Sub-system 200 includes at least one threaded screw 204 inserted into packing casing 72. Seal ring outer ring portion 120 includes a groove 206 having pre-determined axial, radial, and arcual dimensions. A biasing spring-to-seal ring annular attachment groove 208 with predetermined axial, radial, and arcual dimensions is located within seal ring outer ring groove 206. One end of a helical biasing spring 202 is inserted into groove 208 and spring 202 is fixedly attached to seal ring outer ring portion 120. A second end of biasing spring 202 is fixedly attached to threaded screw 204 such that spring 202 is positioned in casing groove 112. Multiple spring arrangements, which include the use of a plurality of biasing springs 202, can be used to minimize the non-uniform radial force and resulting displacement of seal ring 102.

The operation of seal ring assembly 200 is substantially similar to the operation of labyrinth seal assembly 100 described above. One difference between the two operations is the outward biasing force induced on seal ring 102 by biasing spring 202. The additional outward biasing force assists to bias seal ring 102 to a larger diameter. As turbine load and steam pressures are increased, the radially outward force induced by spring 202 must be overcome prior to seal ring 102 shifting radially inward. As a result, radially inward travel of seal ring 102 is delayed until pre-determined operating conditions for turbine 10 are attained.

Figure 5:
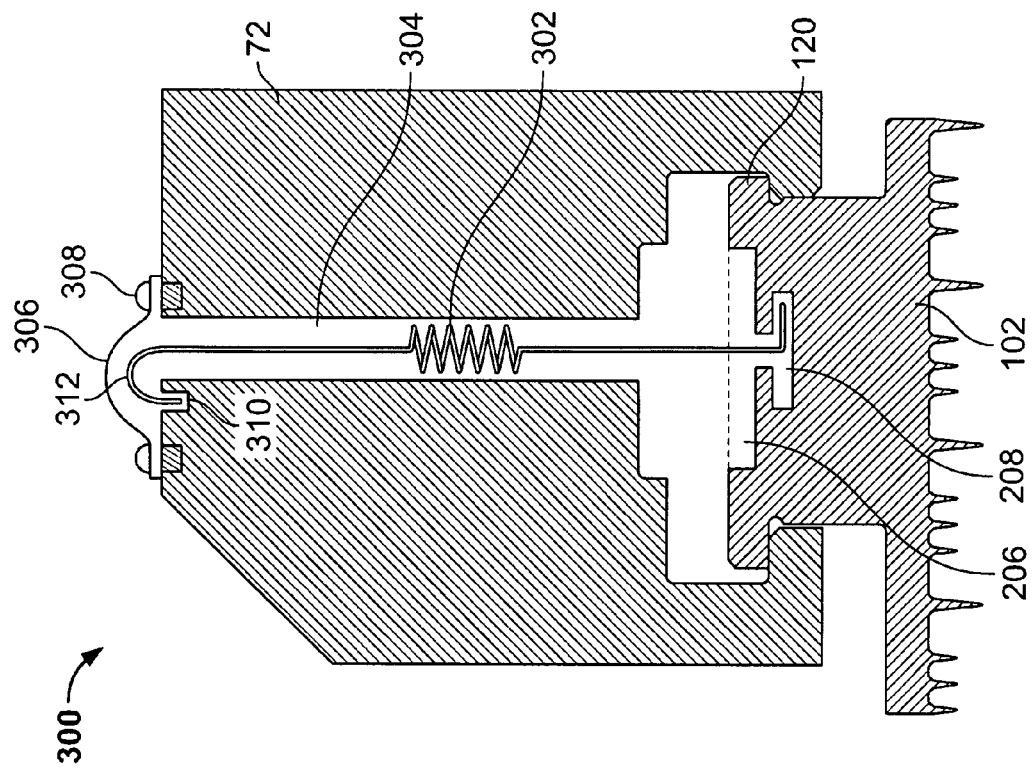
FIG. 5 is an alternative exemplary embodiment of a sealing ring biasing spring sub-system that may be used with the labyrinth seal assembly shown in FIG. 3.

FIG. 5 is an alternative exemplary embodiment sealing ring biasing spring sub-system 300. Sub-system 300 includes a spring passage 304 in packing casing 72. Seal ring outer ring portion 120 contains a groove 206 with predetermined axial, radial and arcual dimensions. Biasing spring-to-seal ring annular attachment groove 208 with pre-determined axial, radial and arcual dimensions is located within seal ring outer ring groove 206. One end of helical biasing spring 302 is inserted into the groove 208 and is fixedly attached to seal ring outer ring portion 120. A spring hook device 312 is attached to a second end of biasing spring 302 which is fixedly attached to casing 72 via a groove 310 in casing groove radially outer surface. A cover plate 306 is coupled to outward most face of casing 72 via a plurality of fasteners 308. Spring 302 is suspended in spring passage 304. Multiple spring arrangements which include the use of a plurality of biasing springs 302 can be used to minimize the non-uniform radial force and resulting displacement of seal ring 102. The tensile force induced in the biasing spring 302 is based on pre-determined seal ring positions for pre-determined turbine operating conditions.

The operation of alternative sub-system 300 is identical to sub-system 200.

The seal assembly described herein facilitates controlling steam leakage between the rotor shaft and the packing casing. More specifically, the seal assembly will cause the clearance of seals to be large during starting, shutdown, or low load conditions, yet small during operation at medium to high loads. As a result, the degradation of operating efficiency increased turbine maintenance costs caused by seal damage can be reduced or eliminated.

Although the methods and systems described and/or illustrated herein are described and/or illustrated with respect to a rotating machine, and more specifically a steam turbine, practice of the methods and systems described and/or illustrated herein is not limited to steam turbines nor to rotating machines generally. Rather, the methods and systems described and/or illustrated herein are applicable to assembling any seal arrangement on any machine.

Exemplary embodiments of seal arrangements are described above in detail. The methods, apparatus and systems are not limited to the specific embodiments described herein nor to the specific seal arrangements assembled, but rather, the seal arrangements may be utilized independently and separately from other methods, apparatus and systems described herein or to assemble seal arrangements not described herein. For example, other seal arrangements can also be assembled using the methods described herein.

While the invention has been described in terms of various specific embodiments, those skilled in the art will recognize that the invention can be practiced with modification within the spirit and scope of the claims.

What is claimed is:

1. A method for assembling at least one seal assembly to a turbine having a casing extending at least partially around a rotor, said method comprising:
   coupling the seal assembly to the casing such that the seal assembly extends into a fluid flow passage defined between the rotor and the casing, wherein the seal assembly includes at least one seal ring including at least one seal ring groove defined therein; and
   coupling at least one spring within the fluid flow passage between the seal assembly and the easing to bias each seal assembly, wherein one end of the at least one spring is fixedly coupled within the at least one seal ring groove, and wherein the at least one spring is radially outward of the at least one seal ring.

2. A method for assembling a turbine in accordance with claim 1 wherein said coupling the seal assembly to the casing comprises inserting the seal assembly into a groove formed in an inner surface of the casing.

3. A method for assembling a turbine in accordance with claim 2 wherein said inserting the seal assembly comprises positioning the seal assembly to facilitate controlling fluid flow between the rotor and the casing during pre-determined turbine operations.

4. A method for assembling a turbine in accordance with claim 3 wherein said positioning the seal assembly comprises positioning the seal assembly to facilitate defining a substantially uniform radial clearance between the rotor and the seal assembly.

5. A method for assembling a turbine in accordance with claim 4 wherein said positioning the seal assembly comprises biasing the seal assembly to a first position during low speed operating conditions.

6. A method for assembling a turbine in accordance with claim 5 wherein said positioning the seal assembly comprises biasing the seal assembly from a first clearance position having a first clearance to a second clearance position having a second clearance during high speed conditions, wherein the second clearance is less than the first clearance.

7. A method for assembling a turbine in accordance with claim 1 wherein said coupling at least one spring comprises positioning the at least one spring to bias the seal assembly radially outward away from the rotor.

8. A seal assembly for a turbine assembly, said seal assembly comprising:
   an annular groove formed in a stationary casing, said groove extending at least partially circumferentially around the turbine;
   a seal ring positioned within said annular groove, said seal ring comprising a plurality of arcuate seal ring segments, at least one of said seal ring segments comprises at least one seal ring groove defined therein; and
   at least one spring coupled between each said seal ring and said stationary casing, one end of said at least one spring is inserted within said at least one seal ring groove such that said at least one spring is radially outward of each said seal ring for inducing a substantially constant spring force to each of said plurality of seal ring segments.

9. A seal assembly in accordance with claim 8 wherein said annular groove is defined at least partially by a pair of opposed shoulders.

10. A seal assembly in accordance with claim 8 wherein said at least one spring facilitates increasing an amount of a clearance space defined between the turbine and said stationary casing.

11. A seal assembly in accordance with claim 8 wherein each of said plurality of arcuate seal ring segments comprises:
    a radially inner sealing surface comprising a plurality of sealing teeth;
    a radially outer ring portion sized to be received in said annular groove, said outer ring portion comprises a radially outer surface and a radially inner surface; and
    a neck portion extending between said radially inner sealing surface and said radially outer ring portion.

12. A seal assembly for a turbine in accordance with claim 8 wherein said at least one spring comprises at least one helical spring configured to bias said seal assembly away from the turbine.

13. A rotary machine comprising:
    at least one rotor assembly;
    at least one stationary turbine casing extending at least partly circumferentially around said at least one rotor assembly such that a clearance gap is defined between said at least one rotor assembly and said at least one stationary turbine casing;
    a plurality of seal assemblies positioned between said at least one stationary casing and said at least one rotor assembly to facilitate controlling said fluid flow through said clearance gap, each of said plurality of seal assemblies includes at least one seal ring comprising at least one seal ring groove defined therein; and
    at least one spring positioned between each of said plurality of seal assemblies and said casing to bias each of said plurality of seal assemblies radially outward away from said at least one rotor assembly, at least a portion of said at least one spring extends within said clearance gap between said at least one stationary casing and said at least one seal ring such that one end of said at least one spring is coupled within said at least one seal ring groove and is radially outward of said at least one seal ring.

14. A rotary machine in accordance with claim 13 wherein said at least one stationary easing comprises at least one annular groove defined therein.

15. A rotary machine in accordance with claim 14 wherein each said at least one groove is defined at least partially by a pair of opposed shoulders.

16. A rotary machine in accordance with claim 13 wherein each of said plurality of seal assemblies comprises a plurality of arcuate seal segments sized to be received within said at least one of said annular grooves.

17. A rotary machine in accordance with claim 13 wherein each of said plurality of seal assemblies comprises a radially outer surface and a radially inner surface extending from said radially outer ring surface.

18. A rotary machine in accordance with claim 13 wherein said plurality of seal assemblies is biased radially inward toward said at least one rotor assembly during pre-determined turbine operations.

19. A rotary machine in accordance with claim 13 wherein said plurality of seal assemblies are biased radially outward away from said at least one rotor assembly during predetermined turbine operations.

20. A rotary machine in accordance with claim 19 wherein said plurality of seal assemblies are biased radially outward wherein an amount of travel of each of said plurality of seal assemblies is limited by said casing.

* * * * *

UNITED STATES PATENT AND TRADEMARK OFFICE
CERTIFICATE OF CORRECTION

PATENT NO. : 7,344,357 B2
APPLICATION NO. : 11/219268
DATED : March 18, 2008
INVENTOR(S) : Couture, Jr. et al.

It is certified that error appears in the above-identified patent and that said Letters Patent is hereby corrected as shown below:

Column 7, line 19, delete "easing" and insert therefor --casing--.
Column 8, line 49, delete "easing" and insert therefor --casing--.

Signed and Sealed this

Ninth Day of February, 2010

David J. Kappos
*Director of the United States Patent and Trademark Office*